United States Patent
Maroney et al.

(10) Patent No.: US 9,430,031 B2
(45) Date of Patent: Aug. 30, 2016

(54) POWER CONSERVATION BASED ON CACHING

(71) Applicant: Western Digital Technologies, Inc., Irvine, CA (US)

(72) Inventors: John E. Maroney, Irvine, CA (US); Hai Le, Aliso Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 213 days.

(21) Appl. No.: 14/149,722

(22) Filed: Jan. 7, 2014

(65) Prior Publication Data

US 2015/0033057 A1  Jan. 29, 2015

Related U.S. Application Data

(60) Provisional application No. 61/859,742, filed on Jul. 29, 2013.

(51) Int. Cl.
*G06F 1/32*  (2006.01)
*G06F 12/08*  (2016.01)

(52) U.S. Cl.
CPC ......... *G06F 1/3275* (2013.01); *G06F 12/0862* (2013.01); *G06F 12/0866* (2013.01); *G06F 12/0868* (2013.01); *Y02B 60/1225* (2013.01)

(58) Field of Classification Search
CPC ............ G06F 1/3275; G06F 12/0866; G06F 12/0862; G06F 12/0868; Y02B 60/1225
See application file for complete search history.

(56) References Cited

U.S. PATENT DOCUMENTS

| | | | |
|---|---|---|---|
| 5,890,211 A | 3/1999 | Sokolov et al. | |
| 5,954,801 A | 9/1999 | Sokolov | |
| 6,499,054 B1 | 12/2002 | Hesselink et al. | |
| 6,606,717 B1 | 8/2003 | Yu et al. | |
| 6,732,158 B1 | 5/2004 | Hesselink et al. | |
| 6,910,099 B1 | 6/2005 | Wang et al. | |
| 6,968,450 B1 | 11/2005 | Rothberg et al. | |
| 7,120,692 B2 | 10/2006 | Hesselink et al. | |
| 7,454,443 B2 | 11/2008 | Ram et al. | |
| 7,467,187 B2 | 12/2008 | Hesselink et al. | |
| 7,546,353 B2 | 6/2009 | Hesselink et al. | |
| 7,587,467 B2 | 9/2009 | Hesselink et al. | |
| 7,600,036 B2 | 10/2009 | Hesselink et al. | |
| 7,664,884 B2 | 2/2010 | Kanamaru et al. | |
| 7,788,404 B2 | 8/2010 | Hesselink et al. | |
| 7,917,628 B2 | 3/2011 | Hesselink et al. | |
| 7,934,251 B2 | 4/2011 | Hesselink et al. | |

(Continued)

OTHER PUBLICATIONS

Archived—"Pod: Maximizing skip protection," Http://support.apple.com/kb/HT2360, last modified Feb. 6, 2009, pp. 1.

(Continued)

*Primary Examiner* — Thuan Du

(57) ABSTRACT

The present invention relates to a method and device that conserves power. In some embodiments, the device is a battery powered storage device. The invention employs a large cache and aggressive caching algorithm to serve data from the storage media (hard disk or SSD) or write data to the storage media. The cache provides an efficient location from which to serve data, especially multi-media. In one embodiment, the algorithm determines when to place the drive into a lower power state, such as idle, or standby, based on the amount of anticipated idle time provided by the large cache.

20 Claims, 7 Drawing Sheets

(56) References Cited

U.S. PATENT DOCUMENTS

| | | |
|---|---|---|
| 7,949,564 B1 | 5/2011 | Hughes et al. |
| 8,004,791 B2 | 8/2011 | Szeremeta et al. |
| 8,255,661 B2 | 8/2012 | Karr et al. |
| 8,285,965 B2 | 10/2012 | Karr et al. |
| 8,341,117 B2 | 12/2012 | Ram et al. |
| 8,341,275 B1 | 12/2012 | Hesselink et al. |
| 8,352,567 B2 | 1/2013 | Hesselink et al. |
| 8,526,798 B2 | 9/2013 | Hesselink |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |
| 8,713,265 B1 | 4/2014 | Rutledge |
| 8,762,682 B1 | 6/2014 | Stevens |
| 8,780,004 B1 | 7/2014 | Chin |
| 8,782,334 B1 | 7/2014 | Boyle et al. |
| 8,793,374 B2 | 7/2014 | Hesselink et al. |
| 8,819,443 B2 | 8/2014 | Lin |
| 9,112,537 B2 * | 8/2015 | Ramirez ............... G06F 11/064 |
| 2002/0161911 A1 | 10/2002 | Pinckney, III et al. |
| 2004/0015731 A1 * | 1/2004 | Chu ..................... G06F 1/3225 |
| | | 713/300 |
| 2005/0144195 A1 | 6/2005 | Hesselink et al. |
| 2005/0144200 A1 | 6/2005 | Hesselink et al. |
| 2007/0136726 A1 * | 6/2007 | Freeland ............. G06F 11/3428 |
| | | 718/100 |
| 2008/0133939 A1 | 6/2008 | Danilak |
| 2010/0332754 A1 | 12/2010 | Lai et al. |
| 2011/0264759 A1 | 10/2011 | Perantatos et al. |
| 2012/0036041 A1 | 2/2012 | Hesselink |
| 2012/0166828 A1 | 6/2012 | Maroney |
| 2012/0317354 A1 | 12/2012 | Yokota et al. |
| 2013/0212401 A1 | 8/2013 | Lin |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |
| 2014/0095439 A1 | 4/2014 | Ram |
| 2014/0169921 A1 | 6/2014 | Carey |
| 2014/0173215 A1 | 6/2014 | Lin et al. |

OTHER PUBLICATIONS

Patent Application filed Jan. 2, 2014 having U.S. Appl. No. 14/146,194, 20 pages.

International Search Report and Written Opinion dated Nov. 28, 2014 from PCT/US2014/048739, filed Jul. 29, 2014, 11 pages.

* cited by examiner

SMALL BLOCK I/O READ/WRITE- NORMAL POWER CONSUMPTION

LARGE BLOCK I/O READ/WRITE - REDUCED POWER CONSUMPTION

POWER CONSERVATION BASED ON CACHING

CROSS-REFERENCE TO RELATED APPLICATIONS

This application claims priority to U.S. Provisional Application No. 61/859,742, entitled "POWER CONSERVATION FOR WIRELESS STORAGE DEVICE BASED ON CACHING," filed Jul. 29, 2013, which is herein incorporated by reference in its entirety.

BACKGROUND

Today, in order to promote mobility, storage devices must operate with limited power, such as a battery or bus-powered. However, the power requirements for many applications, such as video and audio playback, requires high power consumption with current products. Power management and battery life is especially significant for wireless devices, since wireless communications can quickly consume battery power.

Known technologies typically extend battery life by using larger capacity batteries and/or aggressively idling non-essential components. However, these techniques do little to improve the performance of the devices. The known technologies also fail to extend battery life to an acceptable amount, especially for wireless devices.

Accordingly, it would be desirable to provide methods and systems that can conserve power and extend battery life.

BRIEF DESCRIPTION OF THE DRAWINGS

Systems and methods which embody the various features of the invention will now be described with reference to the following drawings, in which.

DETAILED DESCRIPTION

Overview

Embodiments of the present invention relates to a method and device that conserves power especially for battery-powered devices. In some embodiments, the device advantageously modulates its power duty cycle when serving certain types of files. For example, the device may comprise two forms of caches. The first type of cache may be a smaller memory, such as a random access memory (RAM) or flash memory that uses small block input/output. The second type of cache may be a larger bulk cache, such as a flash memory in excess of 256 GB that uses large block input/output. Thus, for certain types of files, such as a streamed multimedia files, the embodiments store large portions of these files in the bulk cache and then modulate the power state of the other components.

In one embodiment, the device employs a large cache and aggressive caching algorithm to serve data from the storage media (hard disk or SSD). The cache provides an efficient location from which to serve data, especially multi-media. In one embodiment, the power conservation algorithm determines when to place the drive into a lower power state, such as idle, or standby, based on the amount of anticipated idle time provided by the large cache.

In another embodiment, the storage device may coalesce or aggregate multiple write blocks in the bulk cache. While coalescing these write operations, the storage device may maintain or place various components in a lower power state to conserve battery power. The controller may then advantageously time the write operations to the storage media into a single sequence to preserve battery power.

For the purpose of illustration, an example will now be described with reference to a wireless storage device, such as a wireless network-attached storage that comprises one or more hard disk drives. Those skilled in the art will recognize that the embodiments may be implemented on a wide variety of types of storage types, such as direct-attached storage, storage area networks, and the like.

Certain embodiments of the inventions will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. To illustrate some of the embodiments, reference will now be made to the figures.

Exemplary Wireless Storage Device and System

Figure 1:
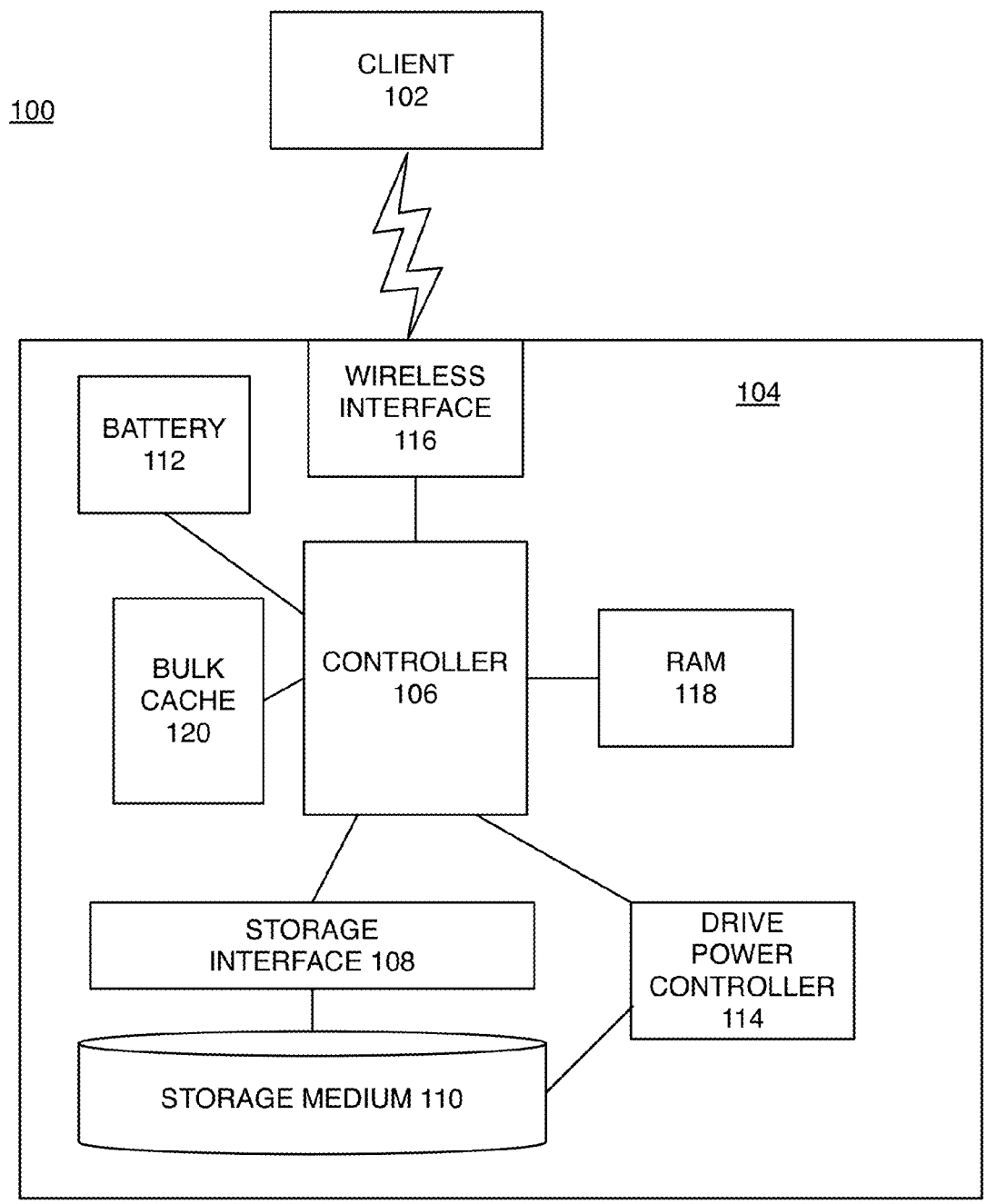
FIG. 1 illustrates an exemplary system in accordance with an embodiment of the present invention.

FIG. 1 shows an exemplary system 100 of an embodiment of the present invention. The embodiments of the present invention may be implemented on any type of storage device or device that provides file services. In particular, as shown, the system 100 may comprise a client device 102 and a storage device 104.

The host or client device 102 may be any type of client device, such as a laptop computer, a desktop computer, a tablet, a smart-phone, etc. Such devices and systems are well known to those skilled in the art.

As shown, the client 102 may communicate with the storage device 104 via a wireless network or communications. The wireless network or wireless communications channel may be any type of wireless communications, such as a WiFi network, 3G network, cellular network, etc. The embodiments may be implemented on any type of wireless network.

The storage device may be any type of device from which files are provided. For purposes of illustration, FIG. 1 shows a wireless-enabled storage device that comprises a network attached storage (NAS), a direct attached storage device (DASD), or other type of external storage device. Such devices are known to those skilled in the art, such as those provided by Western Digital Technologies, Inc.

As shown, the storage device 104 is capable of connecting to a network, such as a wireless network and provides access to files stored in its storage medium as a file server. In one embodiment, NAS is implemented with known hardware, software, and firmware. For example, as shown, the storage device may comprise a controller 106, a storage interface 108, a storage medium 110, a battery 112, a drive power controller 114, a wireless interface 116, a memory or RAM 118, and a bulk cache 120. These components will now be further described below.

In one embodiment, the storage device 104 is configured as an appliance having an embedded operating system. The storage device 104 may support a variety of operating systems, such as UNIX, LINUX, Windows, and the like.

Controller 106 represents the hardware and software that manages the disks of the NAS and presents them as a logical unit or volume to the clients 102. In some embodiments, the controller 106 may also comprise one or more other components to supplement its operations, such as an on-chip RAID controller, a memory or disk cache, etc.

Storage interface 108 serves as an interface to interpret commands from the controller 106 into commands that can be executed by the storage medium 110. For example, the storage interface 108 may support various communications, such as SAS, SATA, SCSI, etc. Such interfaces are well known to those skilled in the art.

The storage medium 110 represents the various storage media on which the storage device 104 may store data. For example, the storage medium 110 may comprise one or more hard disks that are arranged into a RAID. Furthermore, the storage device 104 may support various protocols, such as NFS, SMB/CIFS, AFP, etc.

Of course, in other embodiments, the storage device 104 may comprise other types of storage media and devices, such as solid-state drives, hybrid drives, etc. Any type of storage drive that can be configured as part of a RAID may be implemented as part of an embodiment of the present invention.

Alternatively, as noted above, in other embodiments, the system 100 may comprise direct attached storage devices or external drives. For example, the system 100 may comprise one or more external drives, such as the MyBook or Passport provided by Western Digital Technologies, Inc.

The battery 112 provides a finite-length source of power to the storage device. In the embodiments, any type or number of batteries may be employed alone or in combination. The storage device 104 may also receive power from other sources, such as a DC power supply (not shown).

Drive power controller 114 works with the controller 106 to control the power state and consumption of the storage device 104. In some embodiments, the controller 106 is configured to employ local caching to yield longer battery life over traditional non-caching approaches. In one embodiment, the controller uses a threshold chunk size, such as chunk sizes larger than 256 MB, to determine which form of caching to employ. In response, the drive power controller 114 modulates the duty cycle and power state of one or more other components to optimize the power consumption of the storage device 104. Such operations and algorithms are described further below.

Wireless interface 116 serves as wireless network communications interface for the storage device 104 to/from client 102. In addition, the storage device 104 may comprise one or more other types of communication interfaces, such as Gigabit Ethernet, Ethernet, USB, interfaces for communications with a network or client 102. Such components are known to those skilled in the art. For purposes of illustration, FIG. 1 shows storage device 104 communicating with a single client 102. However, those skilled in the art will recognize that the storage device 104 may communicate with any number of clients and/or networks.

The RAM 118 provides a temporary memory location for use by the controller 106. For example, the RAM 118 may comprise a memory of about 1-4 GB. In some embodiments, the RAM 118 is configured to employ small block input/output, e.g., where chunks of <8 MB or <16 MB are transferred from the storage medium 110.

The bulk cache 120 provides a secondary, bulk memory location for use by the controller. In some embodiments, the bulk cache is a larger memory than the RAM in order to accommodate large chunks of a file, such as a multimedia file. In one embodiment, the bulk cache 120 is a NAND cache. Alternatively, the bulk cache 120 may be implemented using flash memory, one or more portions of a solid-state drive, etc.

For example, if a chunk size is smaller (e.g., smaller than 16 MB), the controller 106 is configured to use conventional caching, e.g., its RAM 118 cache. However, if a chunk size is larger than the threshold (e.g., larger than 16 MB), then the controller 106 is configured to use the bulk cache 120. While cache data is used from the bulk cache 120, the drive power controller 114 commands various portions of the storage drive 104, such as the storage interface 108 and storage medium 110, to be powered down or put into standby to reduce power consumption. In some embodiments, the embodiments provide for battery life of >6 hours using a battery 112 that can fit in a form factor similar to a portable external drive, such as the Passport Studio from Western Digital Technologies, Inc.

Exemplary Power Consumption Modes

Figure 2A:
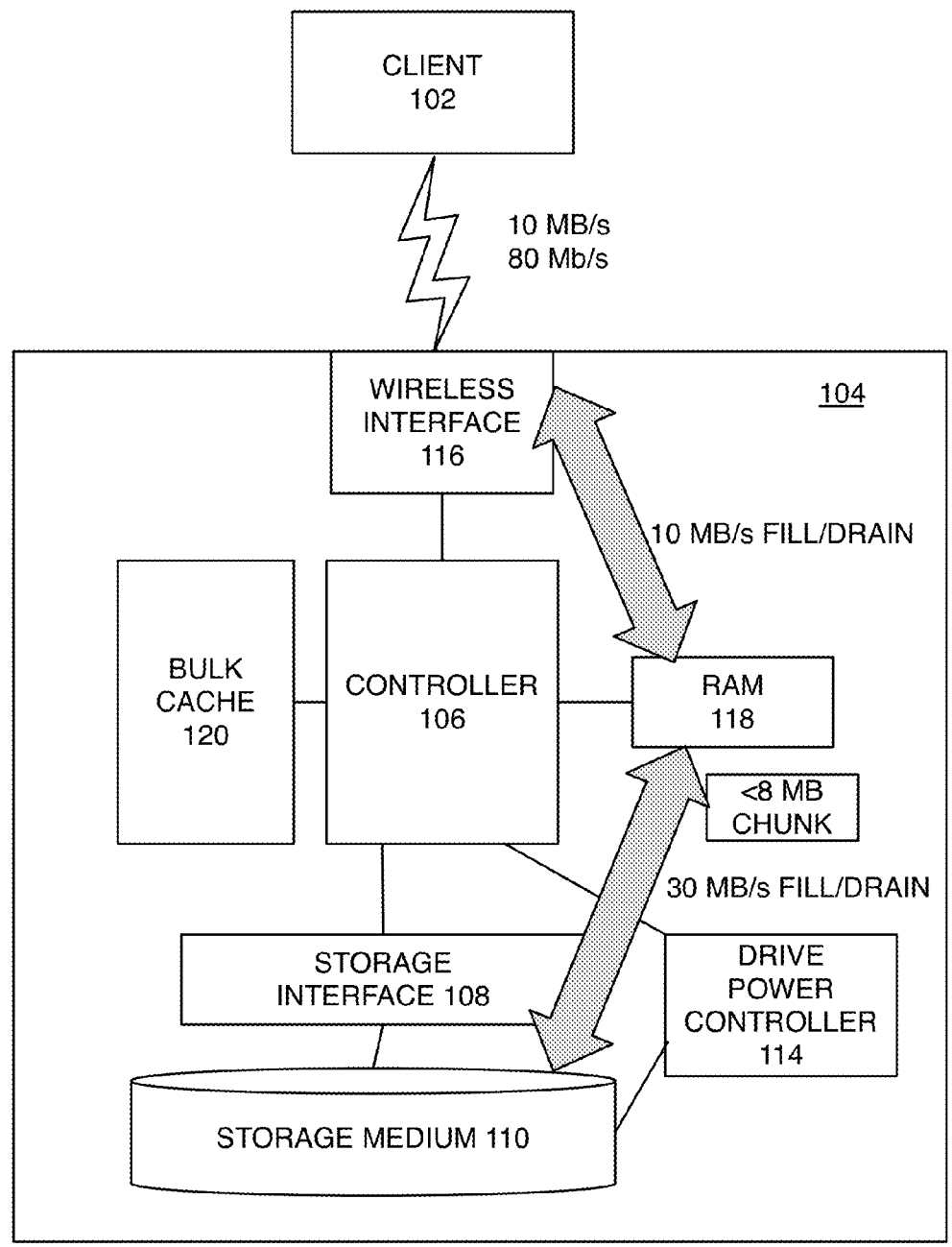
FIG. 2A illustrates operation of the system shown in FIG. 1 using a conventional memory or cache.
Figure 2B:
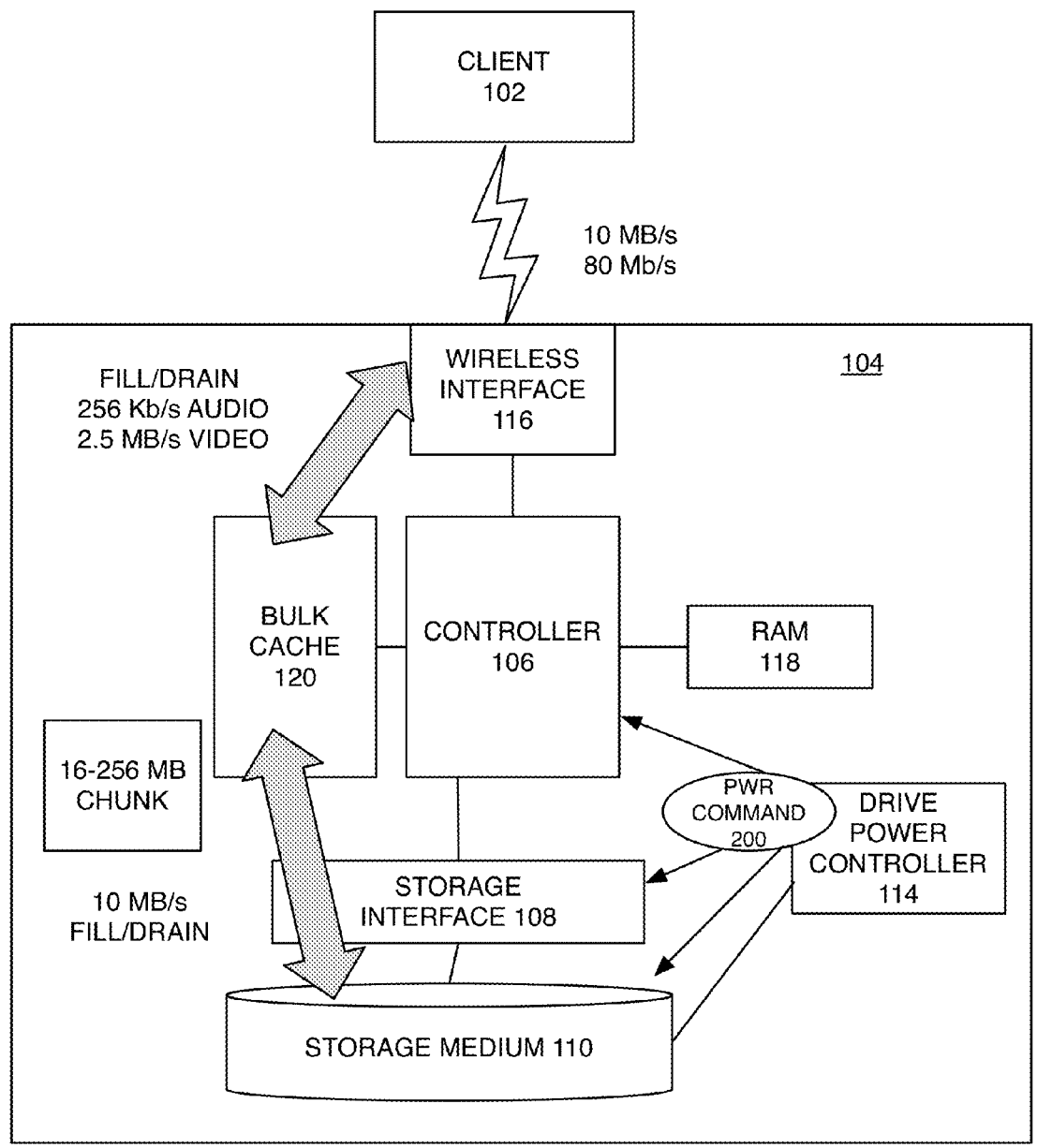
FIG. 2B illustrates operation of the system shown in FIG. 1 using a bulk memory or cache in order to reduce power consumption.

FIGS. 2A and 2B illustrates various scenarios of operation by the embodiments to improve power use and battery conservation. FIG. 2A illustrates read/write operations of the storage device 104 for a typical, small block file. FIG. 2B illustrates read/write operations of the storage device 104 for a large file in which various power conservation actions may be employed.

Referring now to FIG. 2A, the storage device 104 may employ its RAM 118 to serve files that can be handled with small block input/output (e.g., file chunks less than 8 MB). As shown, the storage medium 110 and storage interface 108 may fill the RAM 118 (e.g., at 30 MB/s). The controller 106 may then drain (or fill) the RAM 118 and serve the data to the client 102 at the data rate of the communication channel via wireless interface 116 (e.g., 10 MB/s).

During this mode, since the file access and requests may be relatively unpredictable or stochastic in nature, the storage drive 104 may operate in normal power mode, for example, with the storage medium 110 and storage 108 active.

In contrast, as shown in FIG. 2B, the storage device 104 may reduce its power consumption by employing the bulk cache 120. In particular, for certain types of files, such as multimedia files that are streamed, the controller 106 may employ the bulk cache 120 and large block input/output (e.g., file chunks of 16 MB or more). As noted above, the bulk cache 120 is a larger memory than RAM 118 and may accommodate larger file chunks, e.g., 16 MB, 32 MB, 256 MB, etc.

In addition, the storage medium 110 and storage interface 108 is capable of filling (or draining) data into the bulk cache 120 (e.g., at a data rate of 10 MB/s) that can exceed the data rate at which data is drained (or filled) and serviced to the client 102. For example, for a typical video stream, data may be drained (or filled) from the bulk cache 120 at about 2.5 MB/s. Likewise, for a typical audio stream, data may be drained from the bulk cache 120 at about 256 Kb/s. Therefore, since the drain rate is less than the fill rate and the bulk cache 120 can hold a relatively large portion of data, the controller 106 serve data from the bulk cache 120 and selectively reduce power consumption of other components while data is served from the bulk cache 120.

Figure 4:
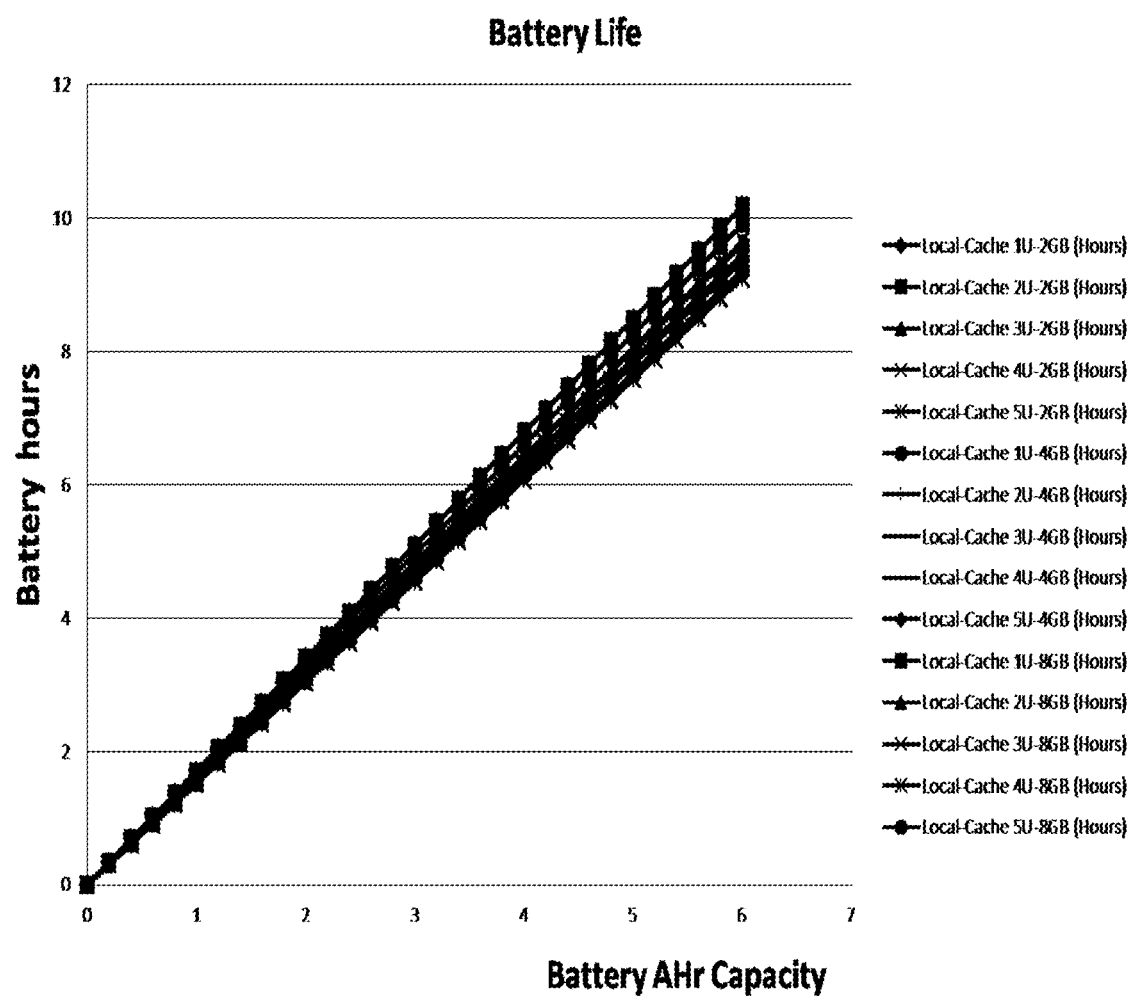
FIG. 4 illustrates a first set of exemplary power consumption scenarios that may be employed by embodiments of the present invention.
Figure 5:
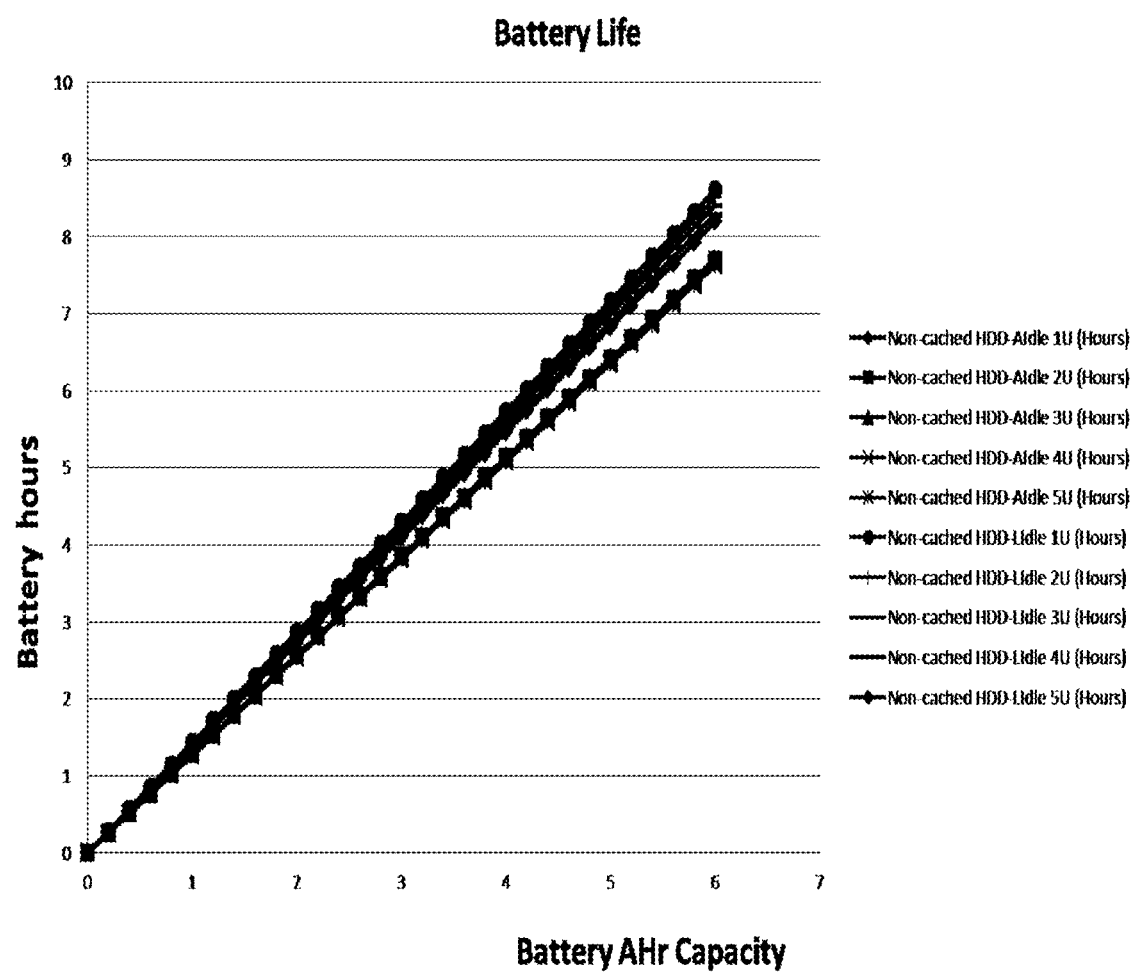
FIG. 5 illustrates a second set of exemplary power consumption scenarios that may be employed by embodiments of the present invention.

For example, as shown in FIG. 2B, the controller 106 and drive power controller 114 may issue various power commands that reduce the power consumption of the storage interface 108, storage medium 110, and controller 106. The power consumption may be reduced to varying degrees. For example, the storage medium 110 may be placed into active standby, standby, spun down, etc. to reduce its power consumption. FIGS. 4-5 illustrate various power consumption scenarios that may be employed by the embodiments.

Furthermore, the controller 106 may employ the bulk cache 120 to read ahead data that is anticipated. For example, the controller 106 may read-ahead an entire playlist into bulk cache 120 when a particular song or songs is requested.

While in a reduced power consumption mode, the storage device 104 may receive one or more write requests. In one embodiment, the controller 106 may coalesce these write requests into the RAM 118 and/or bulk cache 120. For example, the controller 106 may coalesce or aggregate the write request data using small block input/output into the RAM 118. At a later time, for example, when drive power controller 114 is spinning up the storage medium 110, the controller 108 may, at that time, perform the write requests in a single operation or sequence. By coalescing these write requests, the controller 106 may conserve power because these operations into a more efficient sequence or within a shorter burst of activity. Accordingly, in the embodiments, the aggressive caching algorithms can conserve power for both read and write caching types of operations.

Exemplary Process Flow for Read Caching

Figure 3:
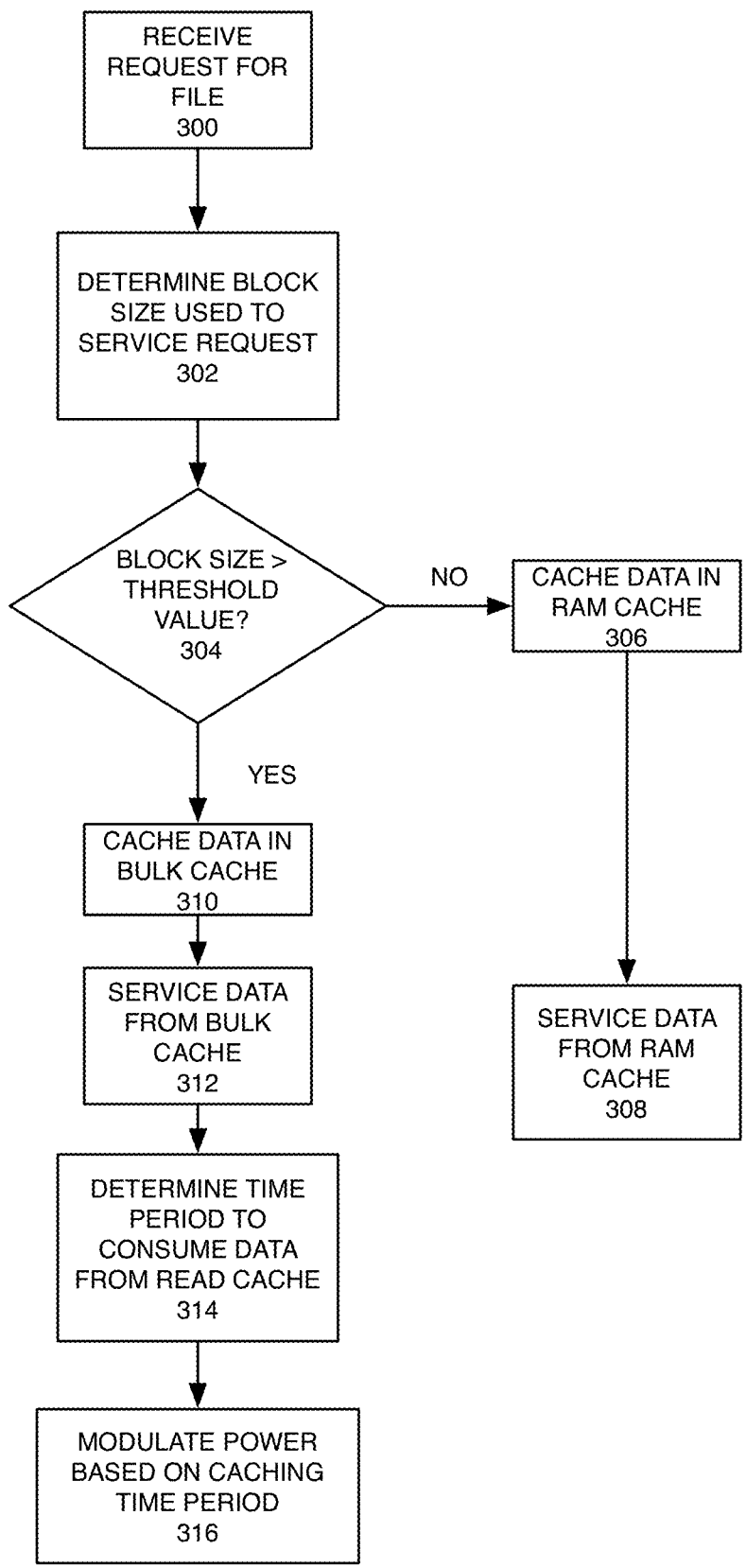
FIG. 3 illustrates an exemplary process flow in accordance with an embodiment of the present invention.

FIG. 3 illustrates an exemplary process flow of one embodiment of the present invention. As shown, in stage 300, the storage device 104 receives a request for a file stored on the storage media 110. The request may be for any type of file, such as a document, a video file, an audio file, etc.

In stage 302, the controller 106 determines a block size for servicing the request. The controller 106 determines the block size based on information in the request or based on the file type. For example, requests for video files that are streamed may use a block or chunk size of 256 MB or more. As another example, a text file may use a block or chunk size of 16 MB or 512 KB.

In stage 304, the controller 106 determines what form of caching to use based on the block size or chunk size. If the chunk size is less than a threshold, such as 256 MB, the request is serviced from the memory of RAM 118. If the chunk size is more than the threshold, then the request is from the bulk cache 120.

In stage 306, the chunk size is less than the threshold, and thus, the controller 106 caches data from the storage media 110 in its RAM 118. In stage 308, the storage device 104 then outputs the data from the RAM 118 to the client 102, e.g., via the wireless network interface 116.

In stage 310, the chunk size was greater than the threshold size, and thus, the controller 106 reads ahead, from the storage media 110, at least one block at the second block size for the requested file into the bulk cache.

In stage 312, the storage device services the host request from the bulk cache. In addition, meanwhile in stage 314, the controller determines an amount of time that the bulk cache can service the request. This amount of time results from the difference in fill rate versus drain rate of the storage interface versus the data rate throughput that is possible over the wireless network. Since the storage interface data rate is faster, the controller can assume it can refill its bulk cache with the next chunk while allowing for idling of the storage.

Accordingly, in stage 316, the controller modulates power consumption of the storage device for a time period based on the block size determined for servicing the request, the transmission rate of the wireless interface, and the rate of consumption of the requested file. For example, the controller 316 may place the storage device into different standby states based on the amount of time provided by caching the chunk in the bulk cache.

FIG. 4 illustrates a first set of scenarios of power consumption by the storage device. In these scenarios, the storage device 104 employs local video read caching with large block sequential IO>16 MB prefetch. In this scenario, the controller 106 may copy/fill 16 to 250 MB chunks into the bulk cache 120 at 10 MB/s and draining performance of 6 Mbps for high definition video streaming. Thus, in this scenario, the drive power controller 114 may turn the storage medium off or place it in standby for various periods of time and extend battery life of battery 112.

For local audio play list read caching (large block sequential IO>16 MB prefetch), the controller 106 may copy/fill 16 to 250 MB chunks into the bulk cache 120 at 10 MB/s and draining performance of 256 Kbps for audio streaming.

FIG. 5 shows a second set of scenarios. In these scenarios, the storage device 104 is performing local read caching with small block random IO<16 MB or chunking of larger file requests. In this scenario, the controller 106 may copy/fill >8 MB blocks of data to the RAM 118 at 30 MB/s and draining performance of 80 Mbps for wireless interface 116. Thus, in this scenario, the storage device performs comparable to known devices.

Figure 6:
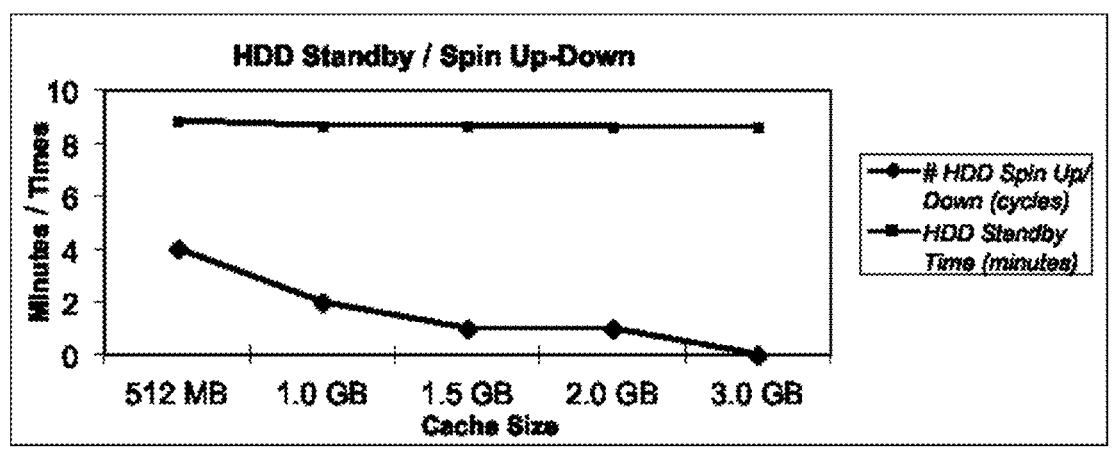
FIG. 6 illustrates an exemplary standby and spin up-down times in relation to cache size that may be employed by embodiments of the present invention to reduce power consumption in accordance with the principles of the present invention.

FIG. 6 shows various examples of the amount of time that may be provided by different sizes of bulk cache 120 relative to spin up-down of a hard disk drive in storage medium 110. For purposes of illustration, bulk cache sizes up to 3 GB are shown. However, those skilled in the art will recognize that any size of bulk cache 120 may be employed in the embodiments.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. A method of conserving power in a storage device comprising a wireless interface, a storage medium, a memory, and a bulk cache, said method comprising:

receiving a request for a file stored on the storage medium;

determining whether a block size associated with the file is greater than a threshold;
when the block size is less than the threshold, servicing the file from the memory; and
when the block size is greater than the threshold:
caching the file in the bulk cache;
servicing the file from the bulk cache;
determining a time period that the bulk cache can service the request based at least in part on a difference between fill rate and drain rate associated with the bulk cache and a transmission rate of the wireless interface; and
placing the storage device in a low power state for the time period.

2. The method of claim 1, wherein the wireless interface comprises a WiFi wireless interface.

3. The method of claim 1, wherein the storage device is a hard-disk drive.

4. The method of claim 1, wherein the block size is 256 MB.

5. The method of claim 1, wherein said receiving the request for the file comprises receiving a request for streaming a multimedia file over the wireless interface.

6. The method of claim 1, wherein determining whether the block size is greater than the threshold is based on the size of the file and whether the file is to be streamed over the wireless interface.

7. The method of claim 1, wherein said placing the storage device in the low power state is based on a number of simultaneous users requesting files from the storage device.

8. The method of claim 1, wherein said placing the storage device in the low power state comprises placing the storage device in a standby state.

9. The method of claim 8, wherein the standby state is an active standby state.

10. The method of claim 8, wherein the standby state is a low standby state.

11. The method of claim 1, wherein said placing the storage device in the low power state comprises placing the storage device in a sleep state.

12. A storage device comprising:
a wireless interface configured to provide a wireless connection to at least one client;
a memory;
a bulk cache;
a storage medium; and
a controller configured to:
receive a host request for a file stored on the storage medium;
determine whether a block size associated with the file is greater than a threshold;
when the block size is determined to be less than the threshold, service the file from the memory; and
when the block size is determined to be greater than the threshold;
service the file from the bulk cache;
determine a time period based at least in part on a difference between fill rate and drain rate associated with the bulk cache and a transmission rate of the wireless interface; and
place the storage device in a low power state for the time period.

13. The storage device of claim 12, wherein the bulk cache comprises at least 2 GB of memory.

14. The storage device of claim 12, wherein the controller is further configured to reduce power consumption for operating the storage medium in the low power state.

15. The storage device of claim 12, wherein the controller is further configured to prefetch blocks of at least 256 MB in the bulk cache for multimedia files streamed via the wireless interface.

16. The storage device of claim 12, wherein the controller is further configured to:
determine a set of additional files related to the requested file; and
prefetch the additional files into the bulk cache.

17. The storage device of claim 12, wherein the controller is further configured to determine a time to next access of the storage medium based on a data rate of the wireless interface and rate of consumption by the at least one client.

18. The storage device of claim 17, wherein the controller is further configured to place the storage medium in a standby state based on the time to next access.

19. The storage device of claim 17, wherein the controller is further configured to place the storage medium in an idle state based on the time to next access.

20. The storage device of claim 17, wherein the controller is further configured to place the storage medium in an active state based on the time to next access and a time required to spin up the storage medium.

* * * * *